(12) United States Patent
Sugie et al.

(10) Patent No.: US 9,108,341 B2
(45) Date of Patent: Aug. 18, 2015

(54) COMPRESSION MOLDING APPARATUS AND MOLDING DIE

(75) Inventors: Rie Sugie, Tokyo (JP); Toshihiro Hoshi, Tokyo (JP); Tadahiro Mita, Tokyo (JP); Kunihiro Fukue, Tokyo (JP); Atsushi Koda, Tokyo (JP); Kazuya Ayabe, Tokyo (JP)

(73) Assignee: AKEBONO BRAKE INDUSTRY CO., LTD., Tokyo (JP)

( * ) Notice: Subject to any disclaimer, the term of this patent is extended or adjusted under 35 U.S.C. 154(b) by 168 days.

(21) Appl. No.: 13/583,436

(22) PCT Filed: Mar. 8, 2011

(86) PCT No.: PCT/JP2011/055421
§ 371 (c)(1),
(2), (4) Date: Oct. 26, 2012

(87) PCT Pub. No.: WO2011/111718
PCT Pub. Date: Sep. 15, 2011

(65) Prior Publication Data
US 2013/0040012 A1  Feb. 14, 2013

(30) Foreign Application Priority Data

Mar. 9, 2010 (JP) ............... 2010-052115
Jan. 18, 2011 (JP) ............... 2011-007861

(51) Int. Cl.
*B29C 43/52* (2006.01)
*B29C 33/02* (2006.01)
(Continued)

(52) U.S. Cl.
CPC .......... *B29C 33/02* (2013.01); *B29C 43/36* (2013.01); *B29C 43/52* (2013.01); *F16D 69/00* (2013.01);
(Continued)

(58) Field of Classification Search
CPC ............ B29C 2045/7393; B29C 45/732; B29C 45/73; B29C 43/52; B29C 45/561; B29C 43/3652; B29C 33/02; B29C 2043/3628; B29L 2031/16; B29L 2031/36
USPC ............... 425/547, 548, 552, 407
See application file for complete search history.

(56) References Cited

U.S. PATENT DOCUMENTS

| 4,309,163 | A | | 1/1982 | Cottancin |
| 5,055,025 | A | * | 10/1991 | Muller ............ 425/144 |
| 5,516,470 | A | * | 5/1996 | Larsson ............ 425/547 |
| 6,936,206 | B1 | | 8/2005 | Satoh et al. |

FOREIGN PATENT DOCUMENTS

| CN | C-100372666 | 3/2008 |
| CN | A-101337413 | 1/2009 |

(Continued)

*Primary Examiner* — Joseph S Del Sole
*Assistant Examiner* — Thukhanh T Nguyen
(74) *Attorney, Agent, or Firm* — Drinker Biddle & Reath LLP

(57) ABSTRACT

Disclosed are a compression molding apparatus and a molding die, whereby efficient hot-molding is performed. The compression molding apparatus performs a molding by providing a raw material into the molding die, and applying heat and pressure to the material. The apparatus is provided with: a first molding die, which forms a molding frame that surrounds a region where the raw material is compression-molded; a second molding die, which compresses the raw material provided into the molding frame; and a heat source section, which supports and heats the second molding die. The second molding die has: a first heat pipe, which has one end positioned on the heat source section side, and the other end positioned on the side of a pressing surface that presses the raw material; and a heat insulating layer, which wraps the first heat pipe along the longitudinal direction of the first heat pipe.

6 Claims, 18 Drawing Sheets

(51) Int. Cl.
- *B29C 43/36* (2006.01)
- *F16D 69/00* (2006.01)
- *B29C 33/04* (2006.01)
- *B29L 31/16* (2006.01)
- *B29L 31/36* (2006.01)
- *F16D 69/04* (2006.01)
- *B29C 45/56* (2006.01)

(52) U.S. Cl.
CPC ............... *B29C 33/04* (2013.01); *B29C 45/561* (2013.01); *B29C 2043/3628* (2013.01); *B29L 2031/16* (2013.01); *B29L 2031/36* (2013.01); *F16D 2069/0491* (2013.01)

(56) References Cited

FOREIGN PATENT DOCUMENTS

| | | |
|---|---|---|
| DE | C2-19829429 | 1/2000 |
| JP | 62-95210 | 5/1987 |
| JP | 63-111024 | 5/1988 |
| JP | 5-91820 | 12/1993 |
| JP | 5-337997 | 12/1993 |
| JP | A-H08-276433 | 10/1996 |
| JP | 11-350411 | 12/1999 |
| JP | 2001-18229 | 1/2001 |
| JP | 2003-291182 | 10/2003 |
| JP | 2005-138366 | 6/2005 |
| JP | 3896461 | 3/2007 |

\* cited by examiner (B)

(C)

VERTICAL ARRANGEMENT OF HEAT PIPES (B)

HORIZONTAL ARRANGEMENT OF HEAT PIPES (C)

VERTICAL AND HORIZONTAL
ARRANGEMENT OF HEAT PIPES

COMPRESSION MOLDING APPARATUS AND MOLDING DIE

TECHNICAL FIELD

The invention is related to a compression molding apparatus and a molding die.

BACKGROUND ART

For example, a friction member for a brake braking a vehicle is manufactured by providing a raw material into a molding die and applying heat and pressure to the raw material. The friction member for a brake has a friction material that contacts a disc or a brake drum rotating together with an axle and is compressed to a pressure plate or a rim. In the friction material, a variety of materials are mixed and bonded by a binder so as to exhibit a predetermined frictional force even under severe using environments.

When thermally molding the friction material, a heat pipe, for example, is embedded in a molding die so as to increase a thermal conductivity of the molding die (for example, refer to PTL 1). In the meantime, the heat pipe is also used in the other molding die or snow-melting apparatus (for example, refer to PTLs 2 to 4).

CITATION LIST

Patent Literature

[PTL 1] JP-U-05-91820
[PTL 2] JP-B-3896461
[PTL 3] JP-A-11-350411
[PTL 4] JP-A-5-337997

SUMMARY OF INVENTION

Technical Problem

When a thermal capacity of the molding die that is used for the compression molding is large, it takes time for the heat to transfer from a heat source to a pressing surface contacting a product to be molded. The problem of the heat transfer rate can be solved by the heat pipe. However, when the thermal capacity of the molding die is large, it takes time for the pressing surface to reach a desired temperature.

The invention has been made to solve the above problems. An object of the invention is to provide a compression molding apparatus and a molding die whereby efficient hot-molding is performed.

Solution to Problem

In order to achieve the above object, according to the invention, a heat pipe embedded in a molding die is wrapped by a heat insulating layer.

Specifically, the invention provides a compression molding apparatus performing a molding by providing a raw material into a molding die, and applying heat and pressure to the raw material. The apparatus includes a first molding die that forms a molding frame that surrounds a region where the raw material is compression-molded; a second molding die that compresses the raw material provided into the molding frame; and a heat source section that supports and heats the second molding die. The second molding die includes a heat pipe that has one end positioned on a side of the heat source section and the other end positioned on a side of a pressing surface pressing the raw material, and a heat insulating layer that wraps the heat pipe along a longitudinal direction of the heat pipe.

The compression molding apparatus can be applied to a hot-molding of a product to be molded, for example a friction material of a disc brake or a drum brake, and can compress the friction material to a pressure plate or a rim, thereby performing the hot-molding.

Here, a molding die is put on the heat source section of the compression molding apparatus, such as heat platen, so as to enable products having various shapes to be manufactured. Therefore, it is necessary to increase a thermal conductivity of the molding die so that heat is effectively transferred to a product to be molded. In the compression molding apparatus, the heat pipe that has one end positioned on a side of the heat source section and the other end positioned on a side of a pressing surface pressing a product to be molded is provided to the molding die. Thereby, it is possible to improve the thermal conductivity.

From a standpoint of thermally molding a product to be molded, for example a friction material, it is not necessary to elevate a temperature of the entire molding die and only the pressing surface contacting the product to be molded may be preferably temperature-elevated. In the heat pipe, a working fluid that is locally heated and evaporated condenses at a part that is not heated, so that the heat is instantaneously moved. Therefore, although the heat moves to only the pressing surface contacting the product to be molded, the heat diffuses into the entire molding die as time goes by. Also, the heat is moved from a side surface of the heat pipe into the molding die, so that the heat is used to elevate a temperature of a part, other than the pressing surface.

Hence, the compression molding apparatus has the heat insulating layer that wraps the heat pipe in the longitudinal direction of the heat pipe. Thereby, the heat of the heat source section is easily transferred to the pressing surface and the heat transfer into the molding die is blocked, so that the efficient hot-molding becomes possible.

In the meantime, the heat insulating layer is a space that is formed in the second molding die. The space may be provided with a support part that extends from the heat source section-side toward the pressing surface-side and supports the pressing surface from behind.

In the molding die formed as described above, the inside of the molding die, which does not contribute to the temperature elevation of the pressing surface, is void. Therefore, the pressing surface is efficiently temperature-elevated by the heat pipe and the heat moved by the heat pipe is difficult to waste, except for the temperature elevation of the pressing surface, so that the efficient hot-molding becomes possible. Also, since the pressing surface is supported by the support part from behind, it is possible to bear the pressing force at the time of pressing the product to be molded.

Also, the second molding die may include a first member that forms the pressing surface; a second member that is arranged between the first member and the heat source section and supports the first member; a first heat insulating material that is interposed between the first member and the second member, and a second heat insulating material that is interposed between the second member and the heat source section.

Thereby, the molding die is configured by the first member forming the pressing surface and the other second member, separately. Also, the second member is positioned between the first heat insulating member and the second heat insulating member. When the molding die is formed as described above, the heat of the heat source section is not transferred to the second member and is transferred to the first member by the heat pipe, so that the efficient hot-molding becomes possible.

Also, at least one end of both ends of the heat pipe may be provided with a gap for absorbing a thermal expansion and contraction amount of the heat pipe. When the gap is provided, it is possible to prevent the heat pipe from being damaged due to the expansion and contraction occurring from a difference of linear thermal expansions of the heat pipe due to a difference between the normal temperature and the using temperature at the time of hot-molding.

Also, the second molding die may include a third member that forms the pressing surface, and a fourth member that is arranged between the third member and the heat source section and supports the third member, and the fourth member may have a second heat pipe embedded therein, which is arranged to extend between a region where the third member is arranged and the other region.

When the heat pipe is embedded in the fourth member as described above, an amount of heat to be radiated from the fourth member to the surrounding is reduced while the heat is transferred from the heat source section to the third member through the fourth member. Thereby, the heat of the heat source section is efficiently transferred to the pressing surface.

In the meantime, it can be said that the invention has an aspect of a molding die. For example, the invention provides a molding die for a compression molding by providing a raw material into the molding die and applying heat and pressure to the material. The molding die may include a first molding die that forms a molding frame that surrounds a region where the raw material is compression-molded, and a second molding die that compresses the raw material provided into the molding frame. The second molding die may include a heat pipe that has one end positioned on a side of a heat source section that supports and heats the second molding die and the other end positioned on a side of a pressing surface that presses the raw material, and a heat insulating layer that wraps the heat pipe in a longitudinal direction of the first heat pipe.

Also, the invention provides a compression molding apparatus performing a molding by providing a raw material into a molding die and applying heat and pressure to the material. The compression molding apparatus may include a first molding die that forms a molding frame that surrounds a region where the raw material is compression-molded; a second molding die that compresses the raw material provided into the molding frame, and a heat source section that supports and heats the second molding die. The second molding die may include a third member that forms a pressing surface, and a fourth member that is arranged between the third member and the heat source section and supports the third member. The fourth member may have a second heat pipe embedded therein, which is arranged to extend between a region where the third member is arranged and the other region.

When the heat pipe is embedded in the fourth member supporting the third member, as described above, the heat of the heat source section, which is transferred to the pressing surface of the third member through the fourth member, is difficult to be radiated from the fourth member to the surrounding. Thus, the heat of the heat source section is efficiently transferred to the pressing surface.

Also, the fourth member may be a plate-shaped member that is arranged between the third member and the heat source section, and the fourth member may have the second heat pipe that extends along a surface supporting the third member and is embedded therein with being arranged to extend between a region where the third member is arranged and the other region, so as to transport heat of the heat source section to the third member, the heat being heat of the other region except for the region where the third member is arranged.

When the heat pipe that transports the heat, which is heat of the other region except for the region where the third member is arranged, to the third member is embedded in the plate-shaped member that is arranged between the third member and the heat source section, the heat of the heat source section to be radiated to the surrounding is collected to the third member. Thus, the heat of the heat source section is efficiently transferred to the pressing surface.

Also, the third member may be supported at a central part of the fourth member, and the fourth member may have the second heat pipe embedded therein, which is arranged to extend between a peripheral part of the central part and the central part.

When the heat pipe, which is arranged to extend between the central part of the fourth member and the peripheral part thereof, is embedded in the fourth member, the heat of the heat source section, which is radiated from the peripheral part to the surrounding, is collected to the central part. Thus, the heat of the heat source section is efficiently transferred to the pressing surface.

Advantageous Effects of Invention

It is possible to provide a compression molding apparatus and a molding die whereby efficient hot-molding is performed.

DESCRIPTION OF EMBODIMENTS

Figure 1:
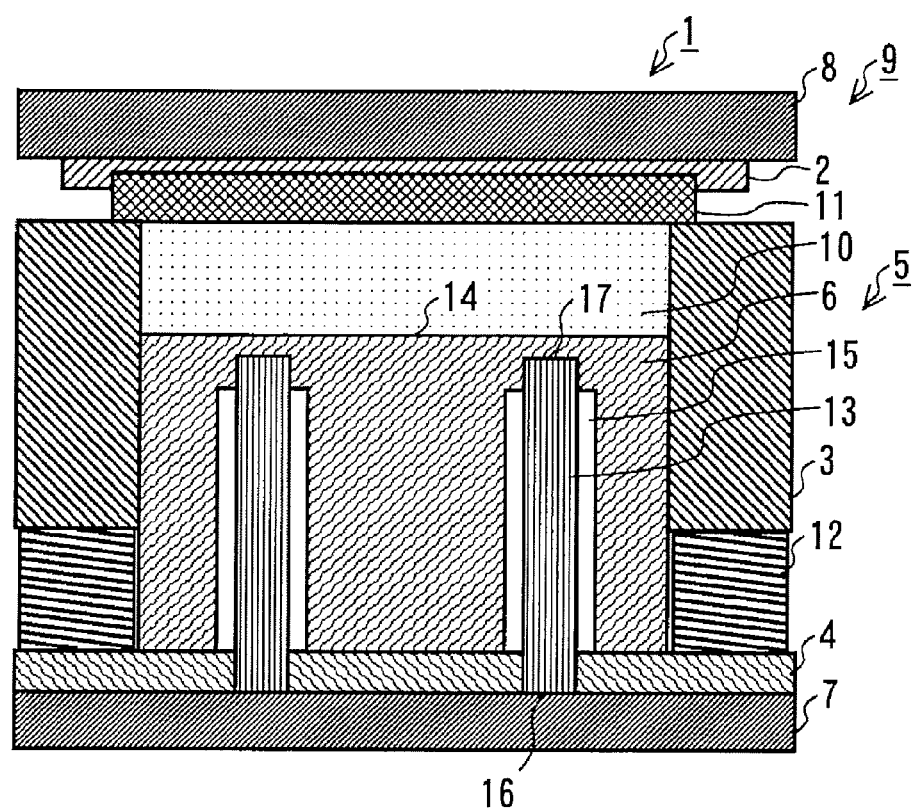
FIG. 1 shows a structure of a compression molding apparatus according to a first embodiment of the invention.

Hereinafter, embodiments of the invention will be described. FIG. 1 shows a structure of a compression molding apparatus 1 according to a first embodiment of the invention.

As shown in FIG. 1, the compression molding apparatus 1 includes a molding die 5 having an upper molding die 2, a middle molding die 3 and a punch (second molding die) 6 provided to stand on a lower molding die 4, and a hot-molding apparatus main body 9 having a lower heat platen (heat source section) 7 to which the punch 6 is fixed via the lower molding die 4 and an upper heat platen 8 to which the upper molding die 2 is fixed. The lower heat platen 7 and the upper heat platen 8 have temperature-elevating heaters (not shown) embedded therein. Heat of the lower heat platen 7 is transferred to the punch 6 and heat of the upper heat platen 8 is transferred to the upper molding die 2. Also, the lower heat platen 7 is moved upward and downward by a hydraulic cylinder (not shown) and is configured to mold a raw material of a friction material 10 that is put in the molding die 5.

The molding die 5 is a molding die for thermally molding a friction material of a brake pad of a disc-type brake and is configured so that after a raw material of the friction material 10 is applied into a molding frame configured by the middle molding die (first molding die) 3, a pressure plate 11 is put on the middle molding die 3 elastically supported to a spring member 12 and the lower molding die 4 is put on and pressed. When the lower molding die 4 is put on, the punch 6 compresses the raw material of the friction material 10, so that the pressure plate 11 is brought into contact with the upper molding die 2. Thereby, a region of the pressure plate 11 where the friction material 10 should be thermally molded is surrounded by the molding frame of the middle molding die 3.

The molding die 5 is heated by the upper heat platen 8 and the lower heat platen 7. Thus, when the molding continues, components such as friction modifier included in the raw material of the friction material 10 are bonded by a binder, so that the hot-molding is performed with being fixed to the pressure plate 11.

Here, as shown in FIG. 1, the punch 6 has heat pipes (first heat pipe) 13. The plurality of the heat pipes 13 is arranged in an upper-lower direction in the punch 6 so that one end thereof is positioned in the vicinity of a lower end of the punch 6 and the other end is positioned at the rear of a pressing surface 14 pressing the friction material 10, i.e., in the vicinity of an upper end of the punch 6.

Also, as shown in FIG. 1, the punch 6 has a heat insulating layer 15 that wraps the heat pipes 13 in a longitudinal direction of the heat pipes 13. The heat insulating layer 15 is an air layer. Since the heat insulating layer 15 is provided around the heat pipes 13, the heat entering a lower side of the heat pipe 13, i.e., the lower end 16 that is an end portion positioned on the lower heat platen 7-side is transferred to the upper ends 17, as it is, without being absorbed to the punch 6 on the way. In the meantime, regarding the heat insulating layer 15, a configuration of suppressing the heat transfer by using a variety of materials having low thermal conductivity may be also adopted, in addition to the above hollow air layer.

The heat pipe 13 encapsulates therein a volatile working fluid. Hence, when the heat pipe is locally heated, a cycle that the working fluid is evaporated and condensed in a non-heated part is repeated, so that the heat is instantaneously transferred. If the heat pipe 13 is not provided, the entire punch 6 is inevitably warmed, so that it takes much time and heat to reach a target temperature. Also, since the molding die 5 has iron as primary component, the heat transfer is very slow. While the heat pipe 13 has the thermal conductivity of 20,000~40,000 W/mK, the iron has the thermal conductivity of about 84 W/mK.

If the heat insulating layer 15 is not provided, the heat that is transferred from the lower end 16 in the heat pipe 13 diffuses into the punch 6 from a side surface of the heat pipe 13 before it reaches the upper end 17. However, according to this embodiment, the punch 6 has the heat insulating layer 15. Thus, the heat that is applied from the lower heat platen 7 at the lower end 16 of the heat pipe 13 is transferred to the upper end 17 without escaping from the side surface of the heat pipe 13 into the punch 6. Thereby, the heat of the lower heat platen 7 is efficiently moved to the pressing surface 14. Hence, according to the molding die 5 of this embodiment, even when it is operated at a cold state, the pressing surface 14 is instantaneously heated, so that it is possible to rapidly start the hot-molding.

In the meantime, the above embodiment can be modified as follows. For convenience of explanation, the same members as the constitutional elements of the compression molding apparatus 1 of the above embodiment are indicated by the same reference numerals and the detailed descriptions thereof are omitted.

Figure 2:
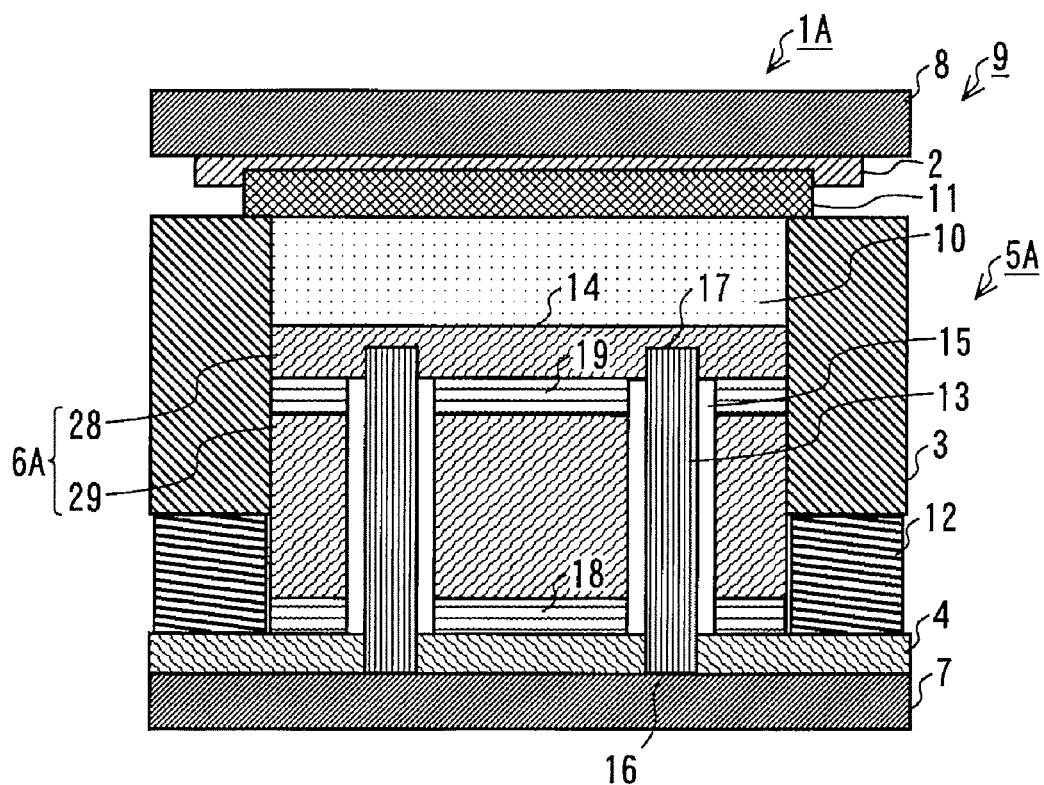
FIG. 2 shows a structure of a compression molding apparatus according to a first modified embodiment of the first embodiment.

FIG. 2 shows a structure of a compression molding apparatus 1A according to a first modified embodiment of the embodiment. As shown in FIG. 2, the compression molding apparatus 1A includes a molding die 5A having the upper molding die 2, the middle molding die 3 and a punch 6A provided to stand on the lower molding die 4, and the hot-molding apparatus main body 9 having the lower heat platen 7 to which the punch 6A is fixed via the lower molding die 4 and the upper heat platen 8 to which the upper molding die 2 is fixed.

Here, the punch 6A has two members of an upper punch (first member) 28 that forms the pressing surface 14 pressing the friction material 10 and a lower punch (second member) 29 that is disposed between the upper punch 28 and the lower heat platen 7 and supports the upper punch 28. Also, the punch 6A has the heat pipes 13 and the heat insulating layer 15, like the punch 6. Also, a heat insulating material is respectively disposed between the upper punch 28 and the lower punch 29 and between the lower punch 29 and the lower molding die 4. The lower heat insulating material that is a second heat insulating material interposed between the lower punch 29 and the lower heat platen 7 is referred to as a lower heat insulating material 18 and the upper heat insulating material that is a first heat insulating material interposed between the upper punch 28 and the lower punch 29 is referred to as an upper heat insulating material 19. The punch 6A is configured by bolt-fastening the upper punch 28 and the lower punch 29 and the upper heat insulating material 19 and the lower heat insulating material 18. The upper heat insulating material 19 and the lower heat insulating material 18 are made of a material capable of withstanding a pressing force at the time of hot-molding, for example a composite material of mica, glass, glass fiber, silicon and the like.

The lower heat insulating material 18 prevents the heat of the lower heat platen 7 from diffusing into the lower punch 29 of the punch 6A, which is a central part for which the heating is not necessary, thereby enabling the heat of the lower heat platen 7 to be easily transferred to the heat pipes 13. Also, the upper heat insulating material 19 prevents the heat obtained from the heat pipes 13 from diffusing into the lower punch 29, thereby enabling the heat of the heat pipes 13 to be easily transferred to the pressing surface 14 of the upper punch 28. The punch 6A adopts a multi-layered structure by the upper punch 28 or lower punch 29 and the upper heat insulating material 19 or lower heat insulating material 18. Hence, according to the molding die 5A of this modified embodiment, even when it is operated at a cold state, the pressing surface 14 is instantaneously heated, so that it is possible to rapidly start the hot-molding.

Figure 3:
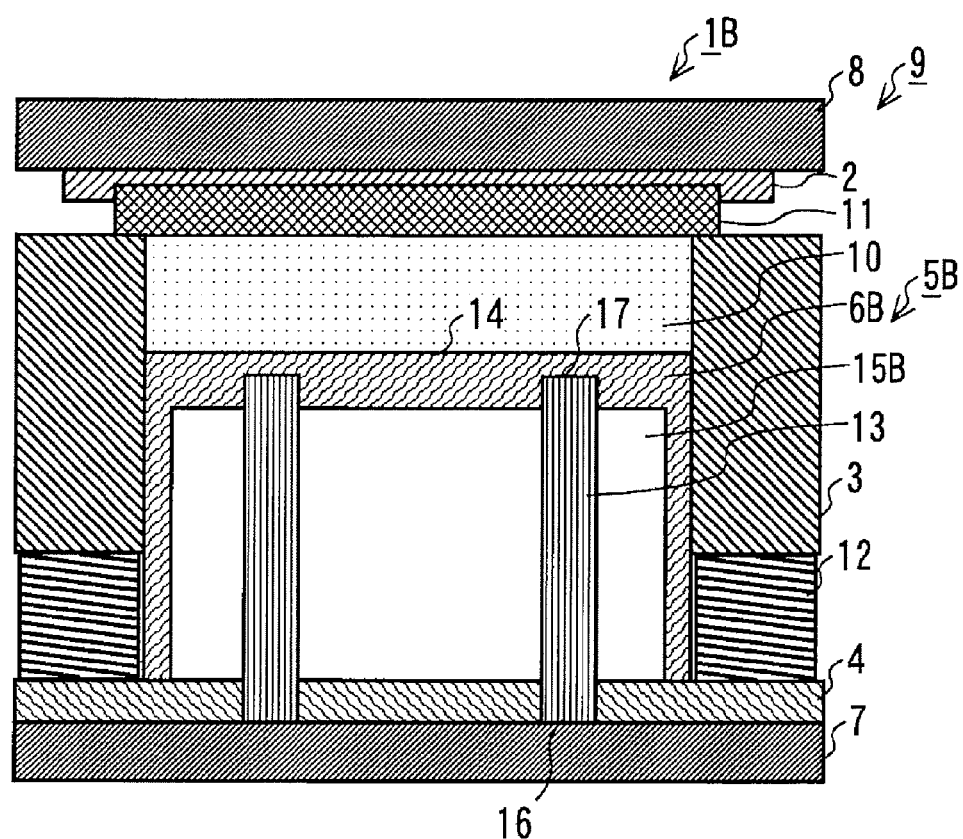
FIG. 3 shows a structure of a compression molding apparatus according to a second modified embodiment of the first embodiment.

FIG. 3 shows a structure of a compression molding apparatus 1B according to a second modified embodiment of the embodiment. As shown in FIG. 3, the compression molding apparatus 1B includes a molding die 5B having the upper molding die 2, the middle molding die 3 and a punch 6B provided to stand on the lower molding die 4, and the hot-molding apparatus main body 9 having the lower heat platen 7 to which the punch 6B is fixed via the lower molding die 4 and the upper heat platen 8 to which the upper molding die 2 is fixed.

Here, the punch 6B has the heat pipes 13 and a heat insulating layer 15B, like the punch 6. Here, the heat insulating layer 15B of this modified embodiment wraps the heat pipes 13 in the longitudinal direction of the heat pipes 13, like the heat insulating layer 15. However, the heat insulating layer is formed over the entire inside of the punch 6B. That is, the heat insulating layer 15B forms a void in the punch 6B. The void is formed in the punch 6B, so that a heat capacity is reduced. Thus, the heat is transferred from the lower end 16 to the upper end 17 of the heat pipe 13 without heat radiation on the way and the heat of the lower heat platen 7 is easily transferred to the heat pipes 13 without the diffusion. Since the punch 6B has the hollow structure, according to the molding die 5B of this modified embodiment, even when it is operated at a cold state, the pressing surface 14 is instantaneously heated, so that it is possible to rapidly start the hot-molding.

Figure 4:
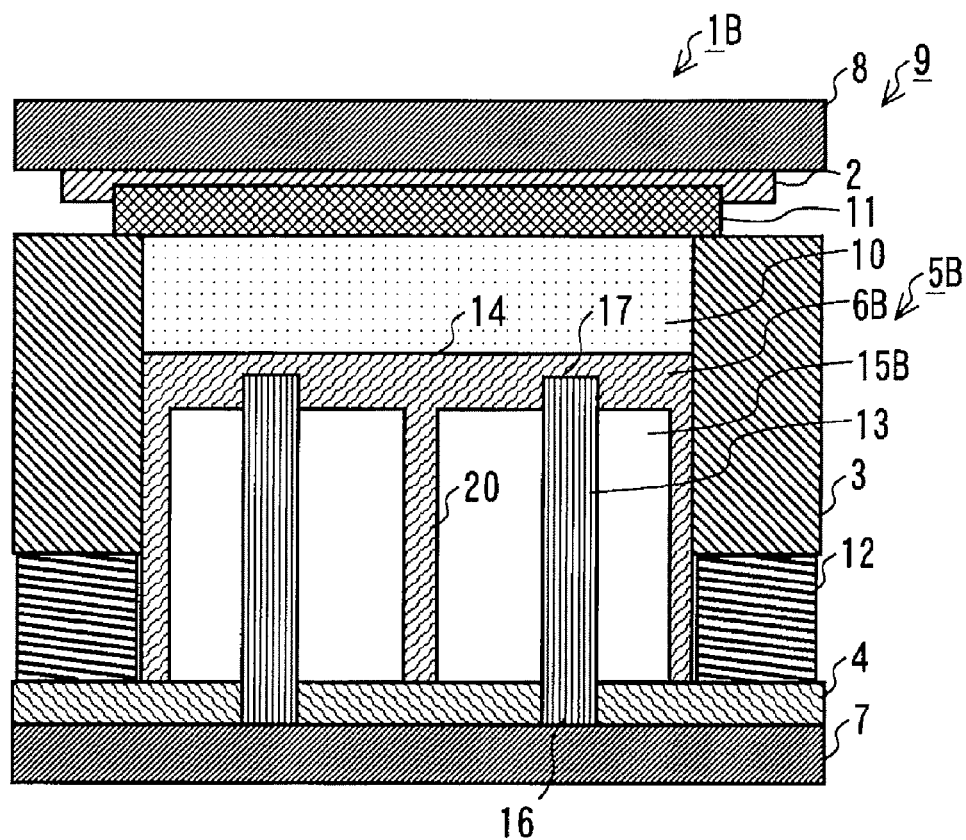
FIG. 4 shows a structure of a compression molding apparatus according to another aspect of the second modified embodiment of the first embodiment.
Figure 5:
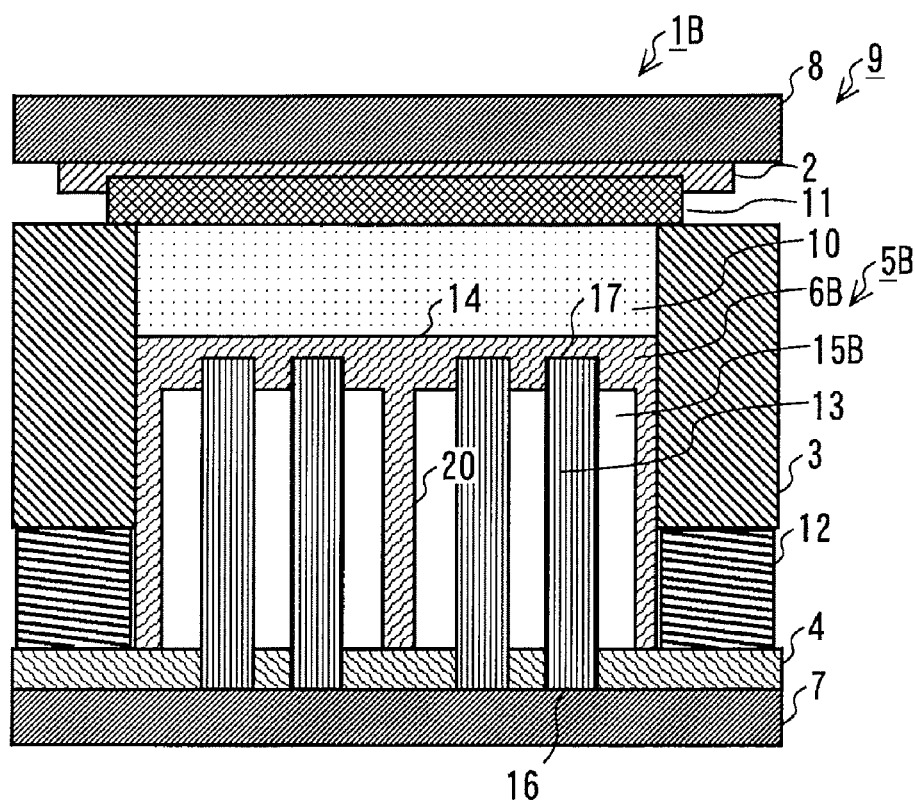
FIG. 5 shows a structure of a compression molding apparatus according to another aspect of the second modified embodiment of the first embodiment.

In the meantime, the compression molding apparatus 1B may be provided with a support part 20 that is provided to stand in the heat insulating layer 15B, so as to prevent the bending of the pressing surface 14 at the time of molding, as shown in FIG. 4 showing another aspect of the second modified embodiment. The support part 20 may be a pillar shape or plate shape. When the heat insulating layer 15B is provided with the support part 20, it is possible to bear the load that is applied to the pressing surface 14 at the time of molding. An arrangement part, a shape, the number and a size of the support part 20 are appropriately determined depending on a size of the heat insulating layer 15B, the number of the heat pipes 13, the load to be applied at the time of molding and the like. For example, there is another aspect as shown in FIG. 5.

Figure 6:
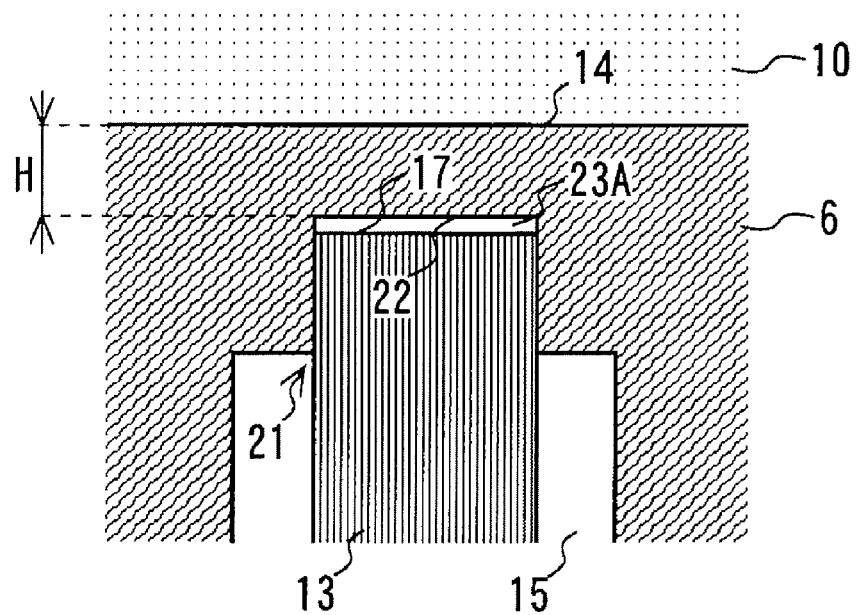
FIG. 6 is an enlarged view of a fixed state of an upper end of a heat pipe.

In the respective embodiment and modified embodiments, the respective heat pipes are fixed as follows. FIG. 6 is an enlarged view of a fixed state of the upper end 17 of the heat pipe 13 of the molding die 5 of this embodiment. While the heat pipe 13 is made of copper, the punch 6 is made of iron. Thus, a coefficient of thermal expansion of the heat pipe 13 is larger than that of the lower molding die 4 or punch 6. Hence, the punch 6 is configured so that a gap 23A is formed between the upper end 17 of the heat pipe 13 and a facing surface 22 of the punch 6 at normal temperatures, as shown in FIG. 6. A length of the gap 23A in the upper-lower direction is appropriately determined depending on a difference between coefficients of thermal expansion of the punch 6 and the heat pipe 13, a difference between linear thermal expansions of the heat pipe 13 when a temperature is increased from the normal temperature to a using temperature, a length of the heat pipe 13 and the like. Also, a thickness H between the facing surface 22 of the punch 6 facing the upper end 17 of the heat pipe 13 and the pressing surface 14 is designed by an appropriate strength calculation so that there is no deformation caused due to the compression molding. In the meantime, the punch 6 may be made of other iron-based materials (for example, steel or various alloys) in addition to the iron. Also, the material of the heat pipe is not limited to the copper, and aluminum, stainless and the like may be adopted.

Figure 7:
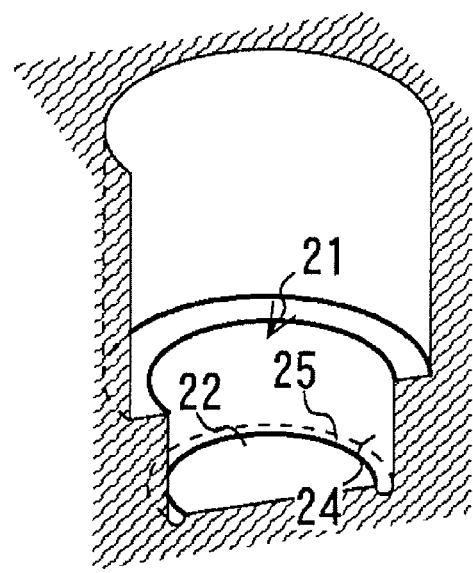
FIG. 7 is a perspective view of a fitting section according to a modified embodiment of the first embodiment of the invention.
Figure 8:
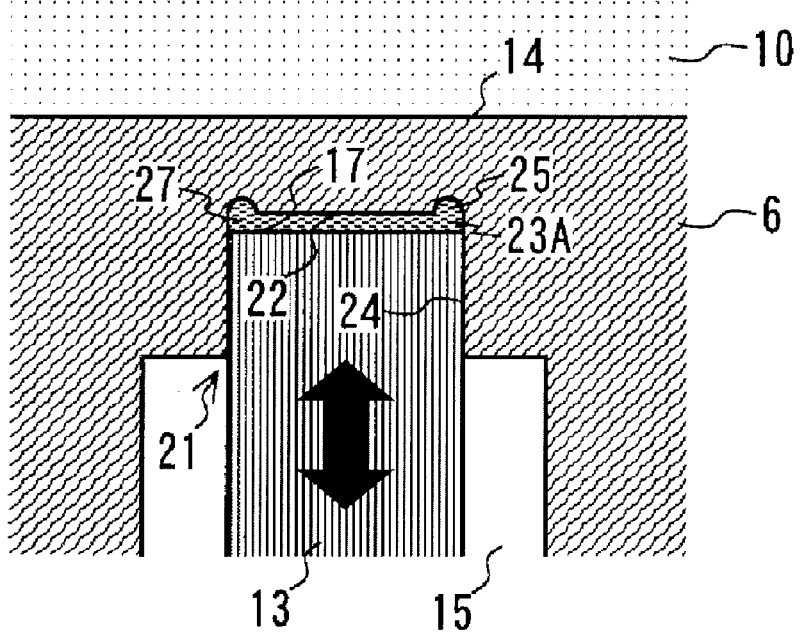
FIG. 8 shows a filled state of heat transfer grease.

Also, a heat-transfer grease may be provided in the gap 23A so as to maintain the thermal conductivity between the heat pipe 13 and the punch 6. The heat-transfer grease is a viscous liquid in which copper powders and the like are mixed so as to express the high thermal conductivity, and is poured into a fitting part 21 when incorporating the heat pipe 13 into the punch 6. In the meantime, when the heat-transfer grease is used, an edge of the facing surface 22 may be provided with an annular slit 25, as shown in FIG. 7. Alternatively, a gap may be provided between the heat pipe 13 and a surrounding wall surface 24 without the slit 25. In a case where the edge of the facing surface 22 is provided with the slit 25, even when the upper end 17 of the heat pipe 13 and the fitting part 21 are relatively displaced by the thermal expansion, the heat-transfer grease 27 in the gap 23A is maintained in the slit 25, as shown in FIG. 8. Therefore, even when the gap 23A is narrowed due to the thermal expansion, a case does not occur in which the heat-transfer grease is ejected from the gap between the surrounding wall surface 24 of the fitting part 21 and the heat pipe 13, is scattered into the heat insulating layer 15 and is thus lost in the fitting part 21.

Figure 9:
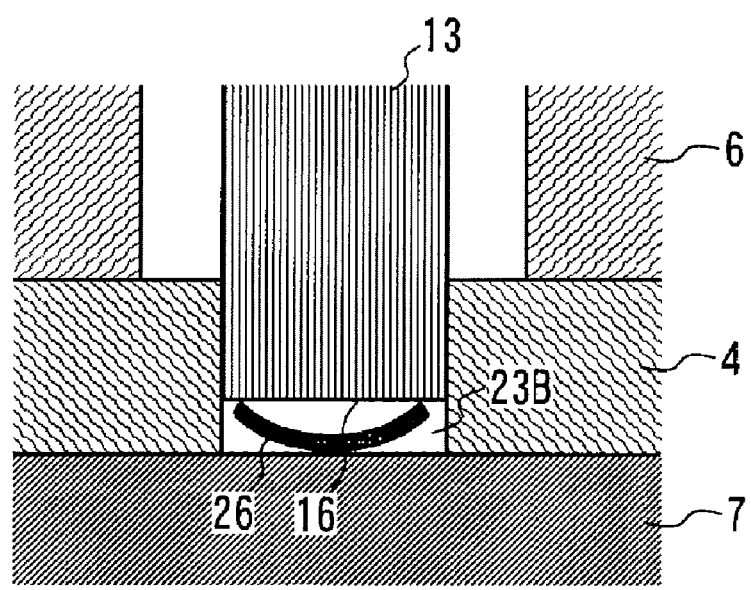
FIG. 9 is an enlarged view of a fixed state of a lower end of the heat pipe.

In the meantime, the heat pipe 13 may be fixed as follows. FIG. 9 is an enlarged view of a fixed state of the lower end 16 of the heat pipe 13 of the molding die 5 of this embodiment. The lower end 16 of the heat pipe 13 is configured so that a gap 23B is formed between the lower end 16 of the heat pipe 13 and the lower heat platen 7 at normal temperatures, as shown in FIG. 9. A length of the gap 23B in the upper-lower direction is appropriately determined depending on the difference between the coefficients of thermal expansion of the punch 6 and the heat pipe 13, the difference between the linear thermal expansions of the heat pipe 13 when a temperature is increased from the normal temperature to a using temperature, the length of the heat pipe 13 and the like, like the gap 23A. Here, the gap 23B is provided therein with a plate spring 26, unlike the gap 23A. The plate spring 26 urges upward the lower end 16 of the heat pipe 13. Thereby, even when the heat pipe 13 and the punch 6 are thermally expanded, the adhesiveness between the upper end 17 of the heat pipe 13 and the facing surface of the fitting part 21, i.e., the thermal conductivity between the upper end 17 of the heat pipe 13 and the punch 6 is maintained. In the meantime, a spiral spring or an elastic member having heat resistance may be inserted and positioned, instead of the plat spring 26.

Meanwhile, in FIGS. 7 to 9, the molding die 5 of the first embodiment of the invention has been modified. However, the molding dies 5A, B of the respective modified embodiments can be likewise modified.

Figure 10:
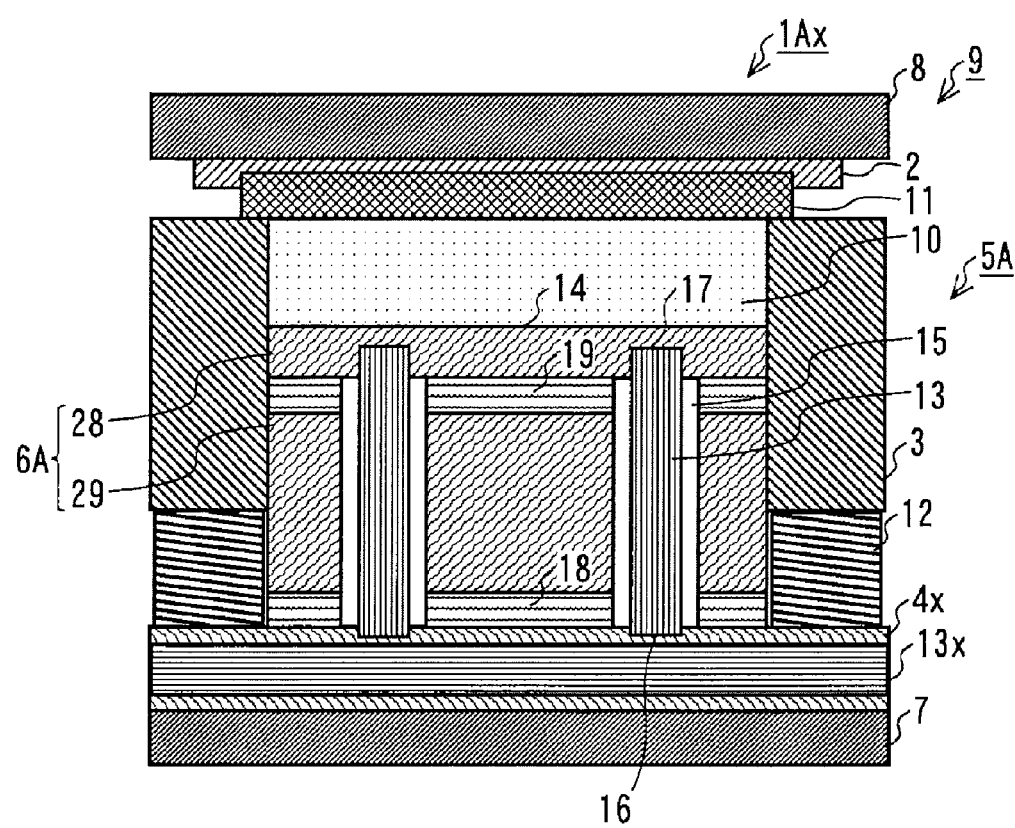
FIG. 10 shows a structure of a compression molding apparatus according to another aspect of the first modified embodiment of the first embodiment.

Also, the respective embodiment and modified embodiments may be modified as follows. Another aspect of the compression molding apparatus 1A of the first modified embodiment of the first embodiment is shown in FIG. 10. Meanwhile, although another aspect of the compression molding apparatus 1A is exemplified, the compression molding apparatus 1 of the first embodiment and the compression molding apparatus 1B of the second modified embodiment of the first embodiment can be likewise modified.

As shown in FIG. 10, in a compression molding apparatus 1Ax of this aspect, heat pipes (second heat pipe) 13x are horizontally embedded in a lower molding die (fourth member) 4x covering the lower heat platen 7. The heat pipes 13x collect the heat of a temperature-elevating heater (not shown), which is embedded in the lower heat platen 7, into the punch 6A, thereby suppressing the heat radiation of the lower molding die 4x.

Figure 11:
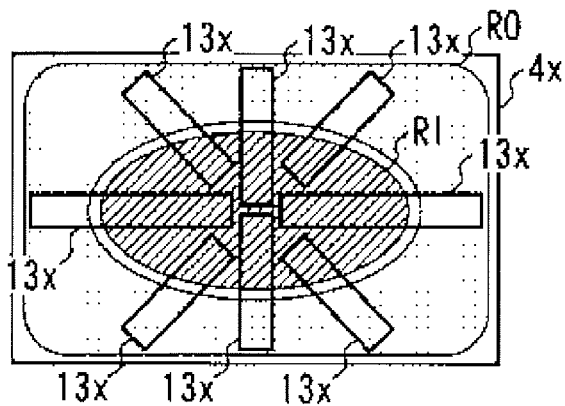
FIG. 11 is a plan view showing a position of the heat pipe embedded in a lower molding die.
Figure 11:
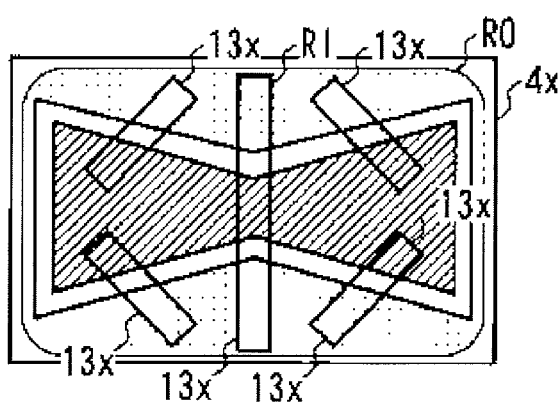
Figure 11:
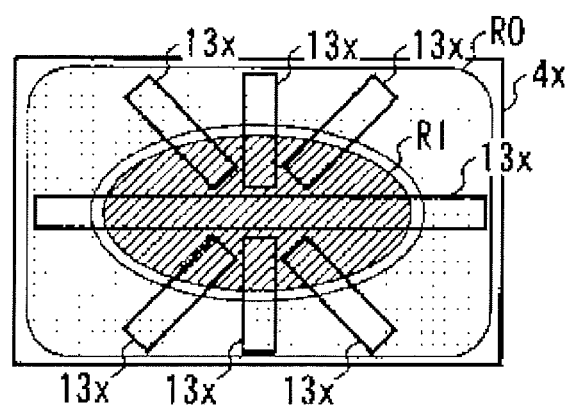

In order to concentrate the heat of the temperature-elevating heater embedded in the lower heat platen 7 into the punch 6A, the heat pipe 13x is embedded in the lower molding die 4x so that the heat pipe is built between a region RI, in which the punch 6A extending along a surface supporting the punch 6A is arranged, and the other region RO, as shown in FIG. 11(A), 11(B) or 11(C). The heat pipe 13x may be built between both regions so that one end thereof is positioned in the region RI and the other end is positioned in the region RO, or may be built between both regions so that both ends are positioned in the region RO and the region RI is interposed therebetween. The region RI is an region in which the punch 6A is arranged and is an region in which the pressing surface 14 of the punch 6 is temperature-elevated when the region is heated. Also, the region RO is an region except for the region in which the punch 6A is arranged and is an region that radiates the heat of the lower heat platen 7 to the surrounding air. Meanwhile, the positions of the heat pipes 13x shown in FIG. 11 are just exemplary and the invention is not limited thereto. For example, any arrangement may be possible insomuch as the heat pipes are built between the region RI and the region RO. For example, when a plurality of the punches 6A is arranged, the heat pipes 13x may be arranged so that the heat pipes are built between the respective regions RI in which the punches 6A are arranged and the other regions RO.

Also, the heat collection effect to the punch 6A, which is obtained as the heat pipes 13x are horizontally embedded in the lower molding die 4x, can be obtained regardless of whether the heat pipes 13 are embedded in the punch 6A. That is, in the compression molding apparatus 1Ax, the heat pipes 13 embedded in the punch 6A may be omitted. The configuration in which the heat pipes are omitted can be also applied to the case where this aspect is applied to the compression molding apparatus 1 of the first embodiment or to the compression molding apparatus 1B of the second modified embodiment.

Figure 12:
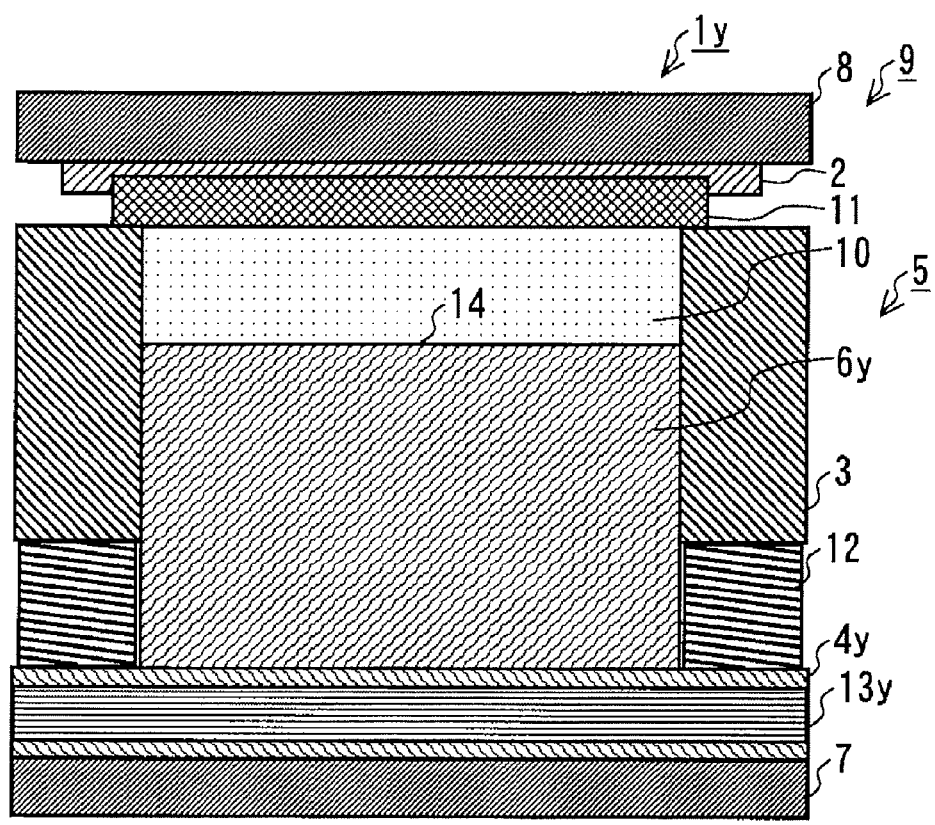
FIG. 12 shows a structure of a compression molding apparatus according to a second embodiment of the invention.

FIG. 12 shows an aspect in which a heat pipe 13y is horizontally embedded in a lower molding die 4y, instead of omitting the heat pipes 13 of the compression molding apparatus 1 of the first embodiment. As shown in FIG. 12, in a compression molding apparatus 1y of the second embodiment, the heat pipes (second heat pipe) 13y are horizontally embedded in the lower molding die (fourth member) 4y, instead of omitting the heat pipes 13 embedded in the punch 6A. The heat pipes 13y collect the heat of the lower heat platen 7 to a punch (third member) 6y. The heat pipes 13y are positioned, as shown in FIG. 11, and are embedded in the lower molding die 4y so that the heat pipes are built between the region RI in which the punch 6y is arranged and the other region RO.

Figure 13:
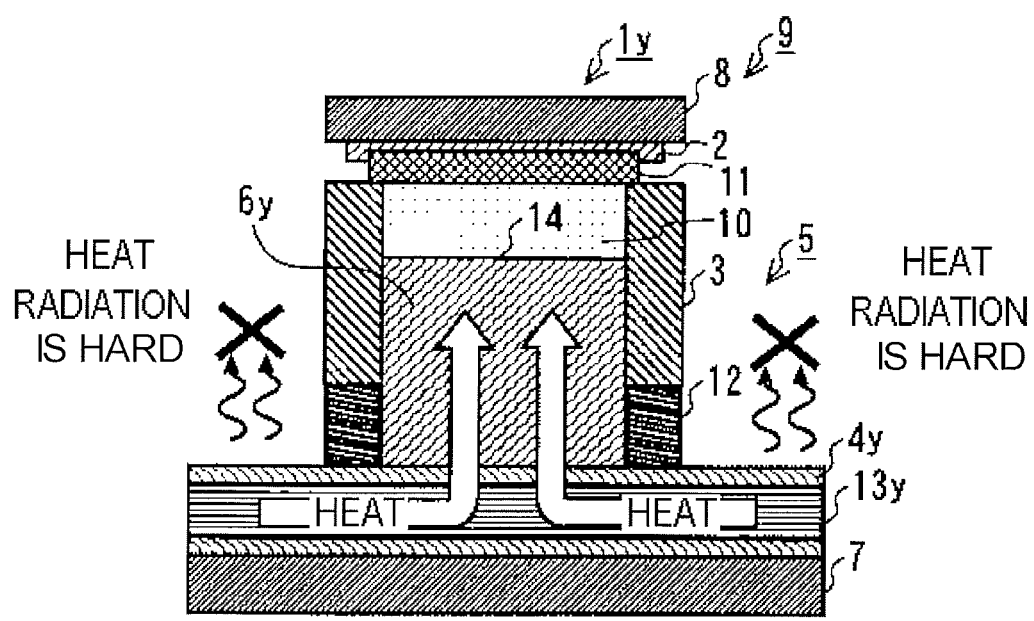
FIG. 13 shows movement of heat in the compression molding apparatus according to the second embodiment.

FIG. 13 shows movement of the heat in the compression molding apparatus 1y of this aspect. Since the punch 6y is supported at a central part of the lower molding die 4y and the heat pipes 13y are embedded with being arranged between the central part of the lower molding die 4y and the central part, the compression molding apparatus 1y can suppress the radiation of the heat of the lower heat platen 7, which is radiated from the surrounding of the punch 6A arranged on the lower molding die 4y, as shown in FIG. 13, for example. Since the heat pipes 13y have a characteristic of transporting the heat from a high temperature part to a low temperature part, the surrounding heat is collected to the punch 6A whose heat is robbed as the friction material 10 is repeatedly put into the molding die 5.

Figure 14:
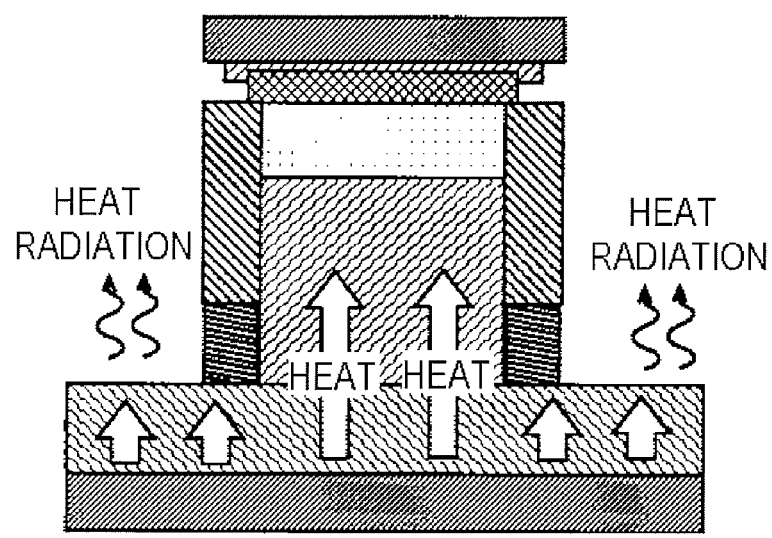
FIG. 14 shows movement of heat in a compression molding apparatus of the prior art.

Meanwhile, as shown in FIG. 14, for example, in a case where the heat pipes 13y are not embedded, even when the friction material is repeatedly applied into the molding die and the heat is thus robbed, the surrounding heat is not collected to the punch. Therefore, it is not possible to suppress the radiation of the heat of the lower heat platen, which is radiated from the surrounding of the punch.

Also, the invention is not limited to the configuration where the horizontal heat pipes 13x and the vertical heat pipes 13 are separately provided. For example, a heat pipe may have an L shape in which the heat pipe passes from the region RO to the region RI, is bent upward and is then arranged in the punch.

Figure 15:
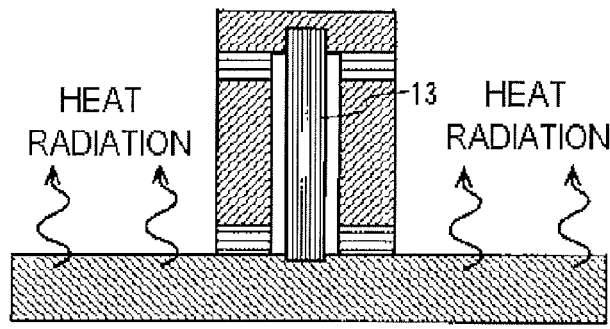
FIG. 15 shows a relation between a heat pipe and heat radiation.
Figure 15:
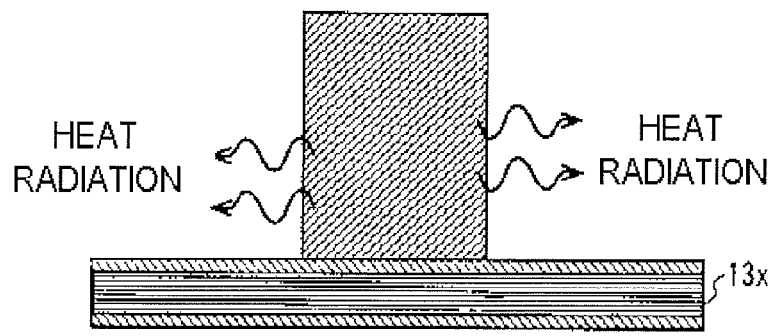
Figure 15:
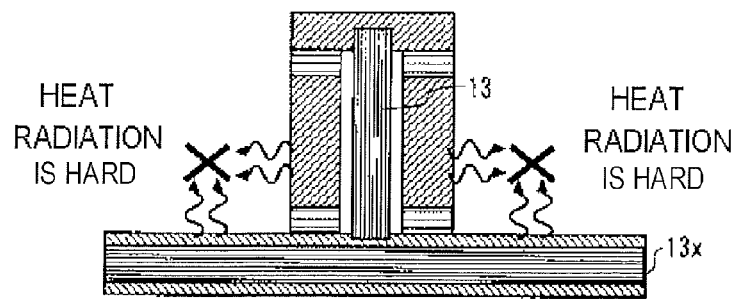

A relation between the heat pipe and the heat radiation is shown in FIG. 15. FIG. 15(A) shows a configuration where only the heat pipe 13, i.e., vertical heat pipe is provided. Also, FIG. 15(B) shows a configuration where only the heat pipe 13x, i.e., horizontal heat pipe is provided. Also, FIG. 15(C) shows a configuration of this modified embodiment where both the heat pipe 13 and the heat pipe 13x are provided. Meanwhile, in FIGS. 15(A) to 15(C), only the punch and the lower molding die are shown and the others are omitted. As shown in FIGS. 15(A) to 15(C), in the configuration where only the vertical heat pipe is provided, the heat of the lower heat platen is not collected to the punch, so that a heat radiation amount is large. Also, in the configuration where only the horizontal heat pipe is provided, the heat of the lower heat platen is collected to the punch but much heat is radiated laterally between the pressing surface of the punch and the lower heat platen. Meanwhile, in the configuration where both the vertical heat pipe and the horizontal heat pipe are provided, the heat of the lower heat platen is efficiently collected to the pressing surface of the punch and the heat radiation amount is small.

Figure 16:
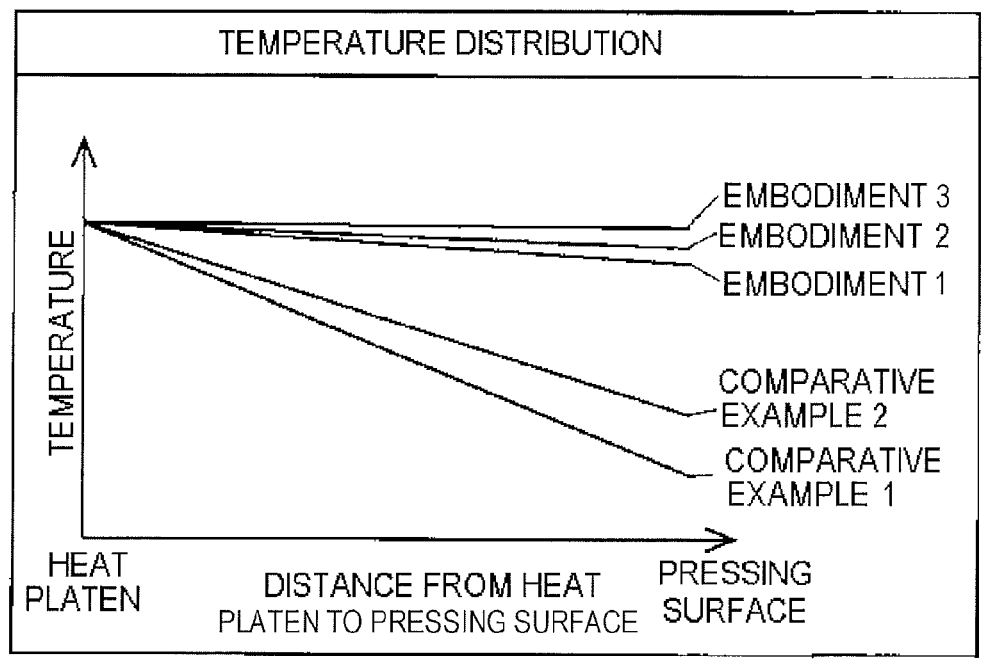
FIG. 16 is a graph showing a temperature gradient from a lower heat platen to a pressing surface.

The effects of the embodiment were verified by a test and a result thereof is described as follows. FIG. 16 is a graph showing temperature gradients from the lower heat platen to the pressing surface in a molding die (comparative example 1) having no heat pipe and heat insulating layer, a molding die (comparative example 2) with a vertical heat pipe and without a heat insulating layer, a molding die (embodiment 1) of the first modified embodiment having a vertical heat pipe and a heat insulating layer, a molding die (embodiment 2) of another aspect of the embodiment having a horizontal heat pipe and a molding die (embodiment 3) of another aspect of the first modified embodiment having vertical and horizontal heat pipes and a heat insulating layer.

As can be clearly seen from the graph of FIG. 16, in the comparative example 1, the temperature is gradually decreased from the heat platen to the pressing surface. In the comparative example 2, it can be seen that the temperature is decreased, like the comparative example 1, although the temperature is not sharply decreased, compared to the comparative example 1. On the other hand, in the embodiments 1 to 3, the temperature is little decreased from the heat platen to the pressing surface. In particular, in the embodiment 3, it can be seen that the temperature is not considerably decreased, even compared to the embodiment 1 or 2.

The reasons are as follows. That is, in the comparative example 1, a transport path of the heat follows a route of the heat platen—the punch inside—the pressing surface. In the comparative example 2, a transport path of the heat follows a route of the heat platen—the heat pipe—the punch inside— the pressing surface. Compared to this, in the embodiment 1 or 3, a transport path of the heat follows a route of the heat platen—the heat pipe—the pressing surface—the punch inside. That is, since the heat is finally transported into the punch inside, the pressing surface is preferentially temperature-elevated. Also, in the embodiment 2, a transport path of the heat follows a route of the heat platen—the horizontal heat pipe—the punch inside—the pressing surface. That is, since the heat of the lower heat platen is collected into the punch inside prior to diffusing to the lower molding die, the pressing surface is preferentially temperature-elevated. Thereby, even after the cold start, the pressing surface is instantaneously heated, so that it is possible to rapidly start the hot-molding. Particularly, in the embodiment 3, since the heat radiation amount to the surrounding of the lower molding die is small, the heat of the heat platen is efficiently transferred to the heat pipe, so that the pressing surface is more preferentially temperature-elevated.

Figure 17:
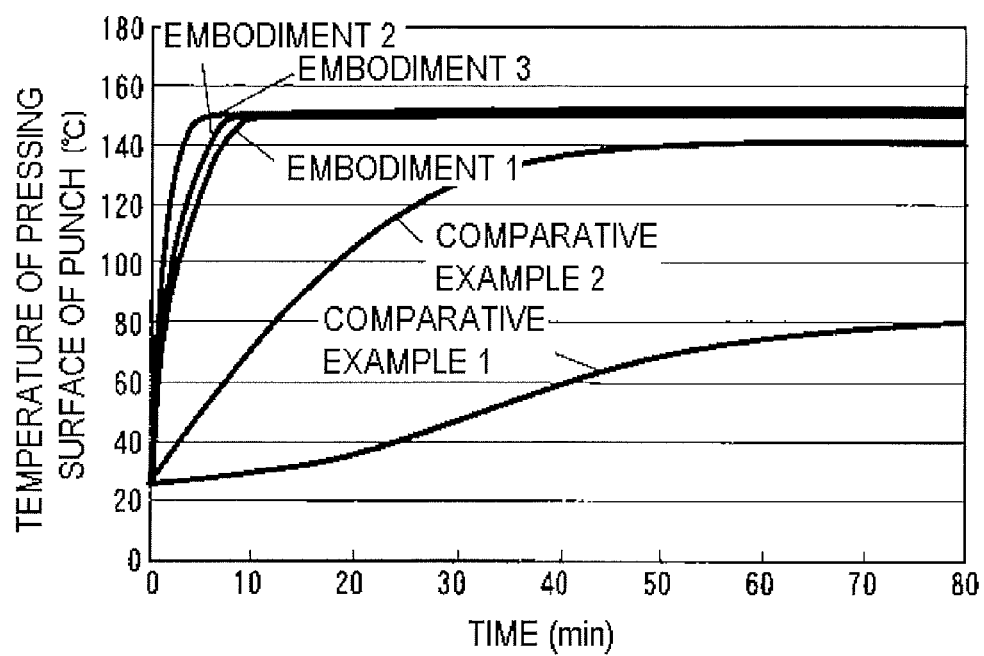
FIG. 17 is a graph showing a temperature change until a temperature elevation of the pressing surface is completed.

Also, FIG. 17 is a graph showing changes in temperature until the temperature elevation of the pressing surface is completed, for the embodiments 1 to 3 and the comparative examples 1 and 2. As shown in FIG. 17, in the embodiment 1, it takes about 10 minutes until the temperature is saturated to about 150 degrees. Also, in the embodiment 2, it takes about 12 minutes until the temperature is saturated to about 151 degrees. Also, in the embodiment 3, it takes about 5 minutes until the temperature is saturated to about 153 degrees. On the other hand, in the comparative example 1, it takes about 80 minutes until the temperature is saturated to about 80 degrees. Also, in the comparative example 2, it takes about 50 minutes until the temperature is saturated to about 140 degrees. In the meantime, in the above test, the setting temperature of the heat platen is 160 degrees.

Like this, in the embodiments 1 to 3, the pressing surface is extremely instantaneously heated, compared to the comparative example 1 or 2. Thus, following advantages are obtained. That is, when the temperature elevation is slow and the temperature difference between the heat platen and the pressing surface is not thus negligible, like the comparative example 1 or 2, it is necessary to take measures, for example to embed a thermocouple in the punch and to take out a wiring from the lower molding die so as to check whether the pressing surface reaches a desired temperature and the friction material can be thus thermally molded. Thereby, it is very troublesome to replace the molding die put on the heat platen. Meanwhile, when the temperature elevation is fast and the temperature difference between the heat platen and the pressing surface is little caused, like the embodiments 1 to 3, it is not necessary to embed a thermocouple in the punch so as to check whether the pressing surface reaches a desired temperature and the friction material can be thus thermally molded. This is because it has only to measure the temperature of the heat platen. Therefore, it is not necessary to take measures, for example to take out the wiring from the lower molding die, and it is possible to easily replace the molding die put on the heat platen. Also, when it is easy to control the temperature of the pressing surface, like the embodiments, it is possible to easily stabilize the quality of the friction material to be molded. In particular, in the embodiment 3, since the heat radiation amount is smaller in the lower molding die, even compared to the embodiment 1 or 2, the saturation temperature of the pressing surface is also higher and the pressing surface reaches the saturation temperature in a short time.

In the meantime, since it was thought that the number of the heat pipes relates to the temperature that the pressing surface can reach, a result of verification thereof is described as follows.

Figure 18:
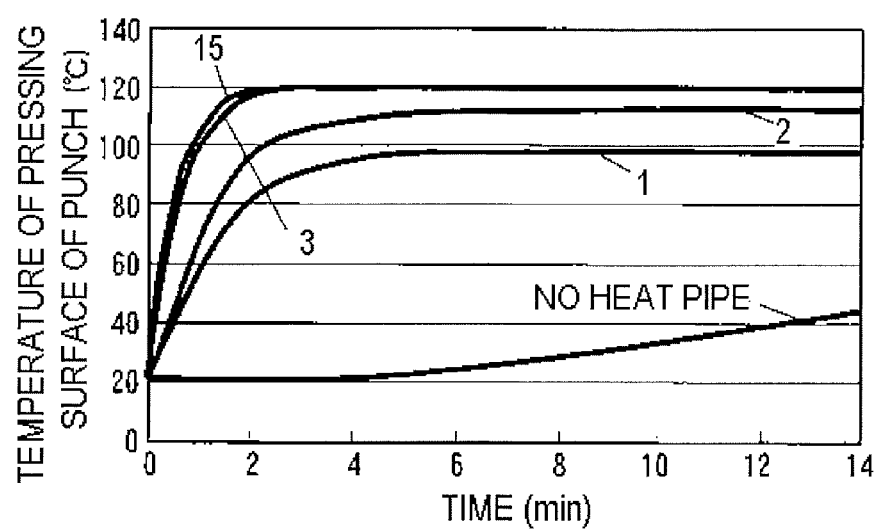
FIG. 18 is a graph showing a relation between the number of the heat pipes and a reachable temperature.

FIG. 18 is a graph showing a relation between the number of the heat pipes and a reachable temperature. As shown in FIG. 18, when the number of the heat pipes is one or two, the reachable temperature (saturation temperature) is about 90 to 110 degrees. However, when the number of the heat pipes is three or more, the reachable temperature is about 120 degrees. In the meantime, at this time, the setting temperature of the heat platen is 120 degrees. The more the heat pipes, the faster the temperature elevation rate. However, from the above result of verification, it can be seen that the saturation temperature is little different when the number of the heat pipes is three or more. The number, the length, the shape (section) and the thickness (diameter) of the heat pipe can be appropriately determined depending on the shape of a product to be manufactured, the temperature elevation rate and the saturation temperature at which the temperature of the molding die is stable.

Although the invention has been specifically described with reference to the specific embodiments and embodiments, it is obvious to one skilled in the art that a variety of changes and modifications can be made without departing from the spirit and scope of the invention. For example, in the above embodiments, the compression molding apparatus 1 and the molding die 5 for thermally molding the friction material 10 of the brake pad of the disc-type brake have been exemplified. However, the compression molding apparatus and the molding die of the invention are not limited thereto and can be applied to the hot-molding of various products to be molded.

This application is based on Japanese Patent Application Nos. 2010-052115 filed on Mar. 9, 2010, and 2011-007861 filed on Jan. 18, 2011, the disclosures of which are incorporated herein by way of reference.

INDUSTRIAL APPLICABILITY

The compression molding apparatus and the molding die of the invention can be applied to the efficient hot-molding of the product to be molded, for example the friction material of a disc brake or drum brake. Also, it is possible to apply the friction material to the pressure plate or rim, thereby performing the hot-molding.

REFERENCE SIGNS LIST 1, 1A, 1B: compression molding apparatus
2: upper molding die
3: middle molding die (first molding die)
4: lower molding die
$4x$, $4y$: lower molding die (fourth member)
5, 5A, 5B: molding die
6, 6A, 6B: punch (second molding die)
$6y$: punch (third member)
7: lower heat platen (heat source section)
10: friction material (raw material)
11: pressure plate
13: heat pipe (first heat pipe)
$13x$, $13y$: heat pipe (second heat pipe)
14: pressing surface
15, 15B: heat insulating layer
28: upper punch (first member)
29: lower punch (second member)

The invention claimed is:

1. A compression molding apparatus performing a molding by providing a raw material into a molding die, and applying heat and pressure to the raw material, the apparatus comprising:

a first molding die that forms a molding frame that surrounds a region where the raw material is compression-molded;
a second molding die that compresses the raw material provided into the molding frame; and
a heat source section, with a heat platen, that supports and heats the second molding die,
wherein the second molding die comprises:
a first heat pipe that has one end positioned on a side of the heat source section and the other end positioned on a side of a pressing surface that presses the raw material, both ends of the first heat pipe being closed and encapsulating therein a volatile working fluid;
a heat insulating layer that wraps the first heat pipe along a longitudinal direction of the first heat pipe so that the heat of the heat source is transferred to the pressing surface while blocking heat transfer to the molding die;
a first member that forms the pressing surface;
a second member that is arranged between the first member and the heat source section and supports the first member;
a first heat insulating material that is interposed between the first member and the second member; and
a second heat insulating material that is interposed between the second member and the heat source section.

2. The compression molding apparatus according to claim 1,
wherein the heat insulating layer is a space that is defined in the second molding die, and
wherein the space is provided with a support part that extends from the side of the heat source section toward the side of the pressing surface and supports the pressing surface from behind.

3. The compression molding apparatus according to claim 1,
wherein at least one end of both ends of the first heat pipe is provided with a gap for absorbing thermal expansion and contraction of the first heat pipe.

4. A compression molding apparatus performing a molding by providing a raw material into a molding die, and applying heat and pressure to the raw material, the apparatus comprising:
a first molding die that forms a molding frame that surrounds a region where the raw material is compression-molded;
a second molding die that compresses the raw material provided into the molding frame; and
a heat source section, with a heat platen, that supports and heats the second molding die,
wherein the second molding die comprises:
a first heat pipe that has one end positioned on a side of the heat source section and the other end positioned on a side of a pressing surface that presses the raw material, both ends of the first heat pipe being closed and encapsulating therein a volatile working fluid;
a heat insulating layer that wraps the first heat pipe along a longitudinal direction of the first heat pipe so that the heat of the heat source is transferred to the pressing surface while blocking heat transfer to the molding die;
a third member that forms the pressing surface; and
a fourth member that is arranged between the third member and the heat source section and supports the third member, and
wherein the fourth member has a second heat pipe embedded therein, which is arranged to extend between a region where the third member is arranged and the other region.

5. A molding die for a compression molding by providing a raw material into the molding die and applying heat and pressure to the raw material, the molding die comprising:
a first molding die that forms a molding frame that surrounds a region where the raw material is compression-molded; and
a second molding die that compresses the raw material provided into the molding frame,
wherein the second molding die comprises:
a first heat pipe that has one end positioned on a side of a heat source section that supports and heats the second molding die with a heat platen and the other end positioned on a side of a pressing surface that presses the raw material, both ends of the first heat pipe being closed and encapsulating therein a volatile working fluid;
a heat insulating layer that wraps the first heat pipe along a longitudinal direction of the first heat pipe so that the heat of the heat source is transferred to the pressing surface while blocking heat transfer to the molding die;
a first member that forms the pressing surface;
a second member that is arranged between the first member and the heat source section and supports the first member;
a first heat insulating material that is interposed between the first member and the second member; and
a second heat insulating material that is interposed between the second member and the heat source section.

6. A molding die for a compression molding by providing a raw material into the molding die and applying heat and pressure to the raw material, the molding die comprising:
a first molding die that forms a molding frame that surrounds a region where the raw material is compression-molded; and
a second molding die that compresses the raw material provided into the molding frame,
wherein the second molding die comprises:
a first heat pipe that has one end positioned on a side of a heat source section that supports and heats the second molding die with a heat platen and the other end positioned on a side of a pressing surface that presses the raw material, both ends of the first heat pipe being closed and encapsulating therein a volatile working fluid;
a heat insulating layer that wraps the first heat pipe along a longitudinal direction of the first heat pipe so that the heat of the heat source is transferred to the pressing surface while blocking heat transfer to the molding die;
a third member that forms the pressing surface; and
a fourth member that is arranged between the third member and the heat source section and supports the third member, and
wherein the fourth member has a second heat pipe embedded therein, which is arranged to extend between a region where the third member is arranged and the other region.

* * * * *